United States Patent
Verma

(10) Patent No.: US 10,581,933 B2
(45) Date of Patent: Mar. 3, 2020

(54) METHOD AND SYSTEM FOR SHARING AN OUTPUT DEVICE BETWEEN MULTIMEDIA DEVICES TO TRANSMIT AND RECEIVE DATA

(71) Applicant: SAMSUNG ELECTRONICS CO., LTD., Suwon-si (KR)

(72) Inventor: Sagar Kumar Verma, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/077,429

(22) Filed: Nov. 12, 2013

(65) Prior Publication Data

US 2014/0136978 A1    May 15, 2014

(30) Foreign Application Priority Data

Nov. 12, 2012  (IN) ............................ 4726/CHE/2012
Aug. 5, 2013   (KR) ........................ 10-2013-0092717

(51) Int. Cl.
*H04L 29/06* (2006.01)
*G06F 3/14* (2006.01)

(52) U.S. Cl.
CPC ........ *H04L 65/1083* (2013.01); *G06F 3/1454* (2013.01)

(58) Field of Classification Search
CPC .. H04L 65/1083; G04N 5/4403; G06F 3/1454
USPC ........................................................ 715/716
See application file for complete search history.

(56) References Cited

U.S. PATENT DOCUMENTS

| | | | |
|---|---|---|---|
| 8,204,959 B2 | 6/2012 | Tabaaloute | |
| 8,577,728 B2 | 11/2013 | Jones et al. | |
| 2004/0267965 A1* | 12/2004 | Vasudevan | G06F 17/30905 709/250 |
| 2005/0073522 A1* | 4/2005 | Aholainen | H04L 41/12 345/440 |
| 2007/0161402 A1* | 7/2007 | Ng | H04L 67/06 455/554.2 |

(Continued)

FOREIGN PATENT DOCUMENTS

| | | |
|---|---|---|
| CN | 201145942 Y | 11/2008 |
| CN | 101796798 A | 8/2010 |

(Continued)

OTHER PUBLICATIONS

Title: Hide and Show the Dock in Mac OS X, Publication Date: Dec. 10, 2010, Publisher: OSXdaily, URL: http://osxdaily.com/2010/12/10/hide-and-show-the-dock/.*

(Continued)

*Primary Examiner* — Abdullah Al Kawsar
*Assistant Examiner* — David V Luu
(74) *Attorney, Agent, or Firm* — Sughrue Mion, PLLC

(57) ABSTRACT

A method and system for sharing an output device between multimedia devices to transmit and receive data, is provided. The method includes operations of automatically discovering one or more second multimedia devices, when a first multimedia device is positioned within communication range of the one or more second multimedia devices that transmit a low power signal; and transmitting data of the first multimedia device to the one or more second multimedia devices, when the one or more second multimedia devices are discovered.

23 Claims, 10 Drawing Sheets

(56) References Cited

U.S. PATENT DOCUMENTS

| | | |
|---|---|---|
| 2007/0213008 A1 | 9/2007 | Lee |
| 2009/0249247 A1* | 10/2009 | Tseng .............. H04M 1/72552 715/808 |
| 2009/0276439 A1* | 11/2009 | Rosenblatt ........ G06F 17/30058 |
| 2010/0037274 A1* | 2/2010 | Meuninck .......... H04N 21/2221 725/109 |
| 2011/0035448 A1* | 2/2011 | Leung .................. G06F 3/1423 709/205 |
| 2011/0219306 A1* | 9/2011 | Lee ........................ H04L 12/66 715/716 |
| 2012/0052829 A1 | 3/2012 | Lee et al. |
| 2012/0139951 A1 | 6/2012 | Hwang et al. |
| 2012/0198098 A1* | 8/2012 | Kim ........................ H04L 67/16 710/8 |
| 2012/0226736 A1 | 9/2012 | Falchuk et al. |
| 2012/0272147 A1* | 10/2012 | Strober ................. H04L 65/60 715/716 |
| 2014/0115025 A1* | 4/2014 | Taoka .................... H04L 67/34 709/201 |

FOREIGN PATENT DOCUMENTS

| | | |
|---|---|---|
| CN | 102486716 A | 6/2012 |
| KR | 2003-0037995 A | 5/2005 |
| KR | 10-2010-0128568 A | 12/2010 |
| KR | 10-2011-0039340 A | 4/2011 |
| KR | 10-2012-0006374 A | 1/2012 |
| WO | 2011/109685 A1 | 9/2011 |
| WO | 2012/050618 A1 | 4/2012 |

OTHER PUBLICATIONS

Communication dated Feb. 27, 2014 issued by the International Searching Authority in counterpart International Application No. PCT/KR2013/010221 (PCT/ISA/210 & PCT/ISA/237).
[MS-DLNHND]: Digital Living Network Alliance (DLNA) Networked Device Interoperability Guidelines: Microsoft Extensions , Total 61 pages, Release: Monday, Jul. 22, 2013, 2013 Microsoft Corporation.
Communication dated Jun. 2, 2016, issued by the European Patent Office in counterpart European Application No. 13854128.9.
Communication dated Jun. 1, 2017 by the State Intellectual Property Office of P.R. China in counterpart Chinese Patent Application No. 201380058968.3.
Communication dated Jun. 26, 2018, issued by the European Patent Office in counterpart European Application No. 13854128.9.
Anonymous, Wireless SingStar Mikrofone Bedienungshandbuch, dated Mar. 28, 2009, XP055486010, total 2 pages.
Communication dated Jun. 5, 2018, issued by the State Intellectual Property Office of P.R. China in counterpart Chinese Application No. 201380058968.3.
Office Action issued in corresponding Indian Application No. 4726/CHE/2012 dated Jan. 25, 2019.
Communication dated Sep. 16, 2019, issued by the Korean Patent Office in counterpart Korean Application No. 10-2013-0092717.

* cited by examiner

METHOD AND SYSTEM FOR SHARING AN OUTPUT DEVICE BETWEEN MULTIMEDIA DEVICES TO TRANSMIT AND RECEIVE DATA

RELATED APPLICATIONS

This application claims priority Indian Patent Application No. 4726/CHE/2012, filed on Nov. 12, 2012, in the Indian Patent Office, and the benefit of Korean Patent Application No. 10-2013-0092717, filed on Aug. 5, 2013, in the Korean Intellectual Property Office, the disclosures of which are incorporated herein by reference, in their entireties.

BACKGROUND

1. Field

One or more exemplary embodiments relate to a multimedia field. More particularly, the exemplary embodiments relate to a method and system for sharing an output device between multimedia devices.

2. Description of the Related Art

In general, multimedia devices are used as independent devices to reproduce multimedia contents. The multimedia devices may respectively reproduce video data and audio data only via their output devices. An example of the output device may include a display screen, an audio output port, a speaker or the like. The multimedia device may be connected to one or more other devices for streaming data such as audio data or video data. However, cables or some wireless technology requiring setups are required which are usually beyond the technical skills of an average user. Thus, a performance of the output device of the multimedia device is limited to its integrated hardware. The related art deals with sharing of a file, rather than with the output device. Also, according to the related art, in order to control multimedia devices and to enable sharing output devices between the multimedia devices, a central server is further required, rather than direct communication between the multimedia devices.

Accordingly, there is demand for a method and system for exchanging data and efficiently sharing an output device between multimedia devices.

SUMMARY

One or more exemplary embodiments include a method and system of sharing an output device in order to output data between multimedia devices, when the data is exchanged between the multimedia devices.

Additional aspects will be set forth in part in the description which follows and, in part, will be apparent from the description, or may be learned by practice of the exemplary embodiments.

According to one or more exemplary embodiments, a method of using, by a first multimedia device, output devices of one or more second multimedia devices includes operations of automatically discovering the one or more second multimedia devices, when the first multimedia device is positioned within communication range of the one or more second multimedia devices that transmit a low power signal; and transmitting data related to the first multimedia device to the one or more second multimedia devices, when the one or more second multimedia devices are discovered.

The low power signal may be periodically transmitted from the one or more second multimedia devices.

Before transmitting data, the method may further include an operation of determining a parameter used to establish a link between the first multimedia device and the one or more second multimedia devices, and the data may be transmitted from the first multimedia device to the one or more second multimedia devices via the link established based on the parameter.

When the one or more second multimedia devices are discovered, the method may further include an operation of outputting notice information via an output device of the first multimedia device.

The method may further include operations of displaying a list of the one or more second multimedia devices on a display of the first multimedia device; and selecting a second multimedia device to receive the data, based on a user input with respect to the list of the one or more second multimedia devices.

The method may further include operations of displaying a list of output devices related to the selected second multimedia device on the display of the first multimedia device; and when an output device is selected based on a user input with respect to the list of the output devices, determining a parameter used to establish a link between the first multimedia device and the selected second multimedia device according to an attribute of the selected output device, and the data may be transmitted from the first multimedia device to the selected second multimedia device via the link established, based on the parameter.

The method may further include an operation of displaying, on the display of the first multimedia device, an option for matching an output device of the selected second multimedia device with the data.

The operation of transmitting the data may include an operation of streaming the data of the first multimedia device from the first multimedia device to the one or more second multimedia devices.

A default operation may be previously set in the first multimedia device so as to allow the first multimedia device to automatically transmit the data, when the one or more second multimedia devices are discovered.

According to one or more exemplary embodiments, a method of outputting, by a first multimedia device, data provided from one or more second multimedia devices includes operations of transmitting a low power signal, wherein the transmitting is performed by a first multimedia device; receiving a request from the one or more second multimedia devices so as to receive the data from the one or more second multimedia devices, when the first multimedia device is discovered by the one or more second multimedia devices, based on the low power signal; receiving the data from the one or more second multimedia devices, in response to the request; and outputting the data via an output device of the first multimedia device, and the first multimedia device may be automatically discovered when the first multimedia device is positioned within communication range of the one or more second multimedia devices.

The method may further include operations of displaying, on a display of the first multimedia device, a list of the one or more second multimedia devices which discover the first multimedia device; and selecting a second multimedia device from among the one or more second multimedia devices, based on a user input with respect to the list, and the operation of receiving the data may include an operation of receiving the data from the selected second multimedia device.

The method may further include an operation of displaying, on the display of the first multimedia device, an option for matching the data of the selected second multimedia device with the output device of the first multimedia device.

The method may further include operations of displaying on a display of the first multimedia device, a list of output devices of the first multimedia device; and determining a parameter used to establish a link between the first multimedia device and the one or more second multimedia devices according to an attribute of the selected output device when an output device of the first multimedia device is selected based on a user input with respect to the list of the output devices, and the data may be transmitted from the one or more second multimedia devices to the first multimedia device via the link established based on the determined parameter.

According to one or more exemplary embodiments, a first multimedia device using output devices of one or more second multimedia devices is configured to include at least one memory; and a processor configured to execute at least one computer program stored in the at least one memory, wherein the at least one computer program includes commands for automatically discovering the one or more second multimedia devices, when the first multimedia device is positioned within communication ranges of the one or more second multimedia devices that transmit a low power signal; and transmitting data of the first multimedia device to the one or more second multimedia devices when the one or more second multimedia devices are discovered.

The low power signal may be periodically transmitted from the one or more second multimedia devices.

The first multimedia device may be further configured to include commands for determining a parameter used to establish a link between the first multimedia device and the one or more second multimedia devices, prior to transmitting the data, and the data may be transmitted from the first multimedia device to the one or more second multimedia devices via the link which is established based on the determined parameter.

The first multimedia device may further include commands for outputting notice information via an output device of the first multimedia device when the one or more second multimedia devices are discovered.

The first multimedia device may be further configured to include commands to display on a display of the first multimedia device, a list of the one or more second multimedia devices; and selecting a second multimedia device to receive the data, based on a user input with respect to the list of the one or more second multimedia devices.

The first multimedia device may be further configured to include commands for displaying a list of output devices of the selected second multimedia device on the display of the first multimedia device; and determine a parameter used to establish a link between the first multimedia device and the selected second multimedia device according to an attribute of the selected output device when an output device is selected based on a user input with respect to the list of the output devices , and the data may be transmitted from the first multimedia device to the selected second multimedia device via the link established based on the determined parameter.

The first multimedia device may further include commands for displaying, on the display of the first multimedia device, an option for matching an output device of the selected second multimedia device with the data.

According to one or more exemplary embodiments, a first multimedia device configured to output data provided from one or more second multimedia devices includes at least one memory; and a processor configured to execute at least one computer program stored in the at least one memory, wherein the at least one computer program includes commands for transmitting a low power signal by a first multimedia device,; receiving a request from the one or more second multimedia devices so as to receive the data from the one or more second multimedia devices when the first multimedia device is discovered by the one or more second multimedia devices, based on the low power signal; receiving the data from the one or more second multimedia devices, in response to the received request; and outputting the data via an output device of the first multimedia device, and wherein the first multimedia device is automatically discovered when the first multimedia device is positioned within communication range of the one or more second multimedia devices.

The first multimedia device may be further configured to include commands for displaying, on a display of the first multimedia device, a list of the one or more second multimedia devices that discover the first multimedia device; and selecting a second multimedia device from among the one or more second multimedia devices, based on a user input with respect to the list of the one or more second multimedia devices, and the command for receiving the data may include a command for receiving the data from the selected second multimedia device.

The first multimedia device may be further configured to include commands for displaying, on the display of the first multimedia device, an option to match the data of the selected second multimedia device with the output device of the first multimedia device.

The first multimedia device may be further configured to include commands to display on a display of the first multimedia device a list of output devices of the first multimedia device; and when an output device of the first multimedia device is selected based on a user input with respect to the list of the output devices, determining a parameter used to establish a link between the first multimedia device and the one or more second multimedia devices according to an attribute of the selected output device of the first multimedia device, and the data may be transmitted from the one or more second multimedia devices to the first multimedia device via the link established based on the parameter.

According to one or more exemplary embodiments, a non-transitory computer-readable recording medium includes a recorded program which, when executed by a processor of a computer, causes the computer to execute the method.

An aspect of an exemplary embodiment may provide an apparatus configured to share an output device between a plurality of multimedia devices in order to transmit and receive data, the apparatus including: first and second multimedia devices having a plurality of output devices, wherein the first multimedia device is configured to discover the second multimedia device through a low power signal transmitted by the second multimedia device and to select the second multimedia device and share an output device of the discovered second multimedia device, wherein the first multimedia device is configured to stream data to the shared output device of the selected second multimedia device.

The apparatus may further include discovering the second multimedia device when the first multimedia device is positioned within communication range of the second multimedia devices.

The first multimedia device may be configured to display a list of output devices of the selected second multimedia device on the display of the first multimedia device.

The first multimedia device may be configured to determine a parameter used to establish a link between the first multimedia device and the selected second multimedia device according to an attribute of the shared output device when an output device is selected based on a user input with respect to the list of the output devices of the selected second multimedia device.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
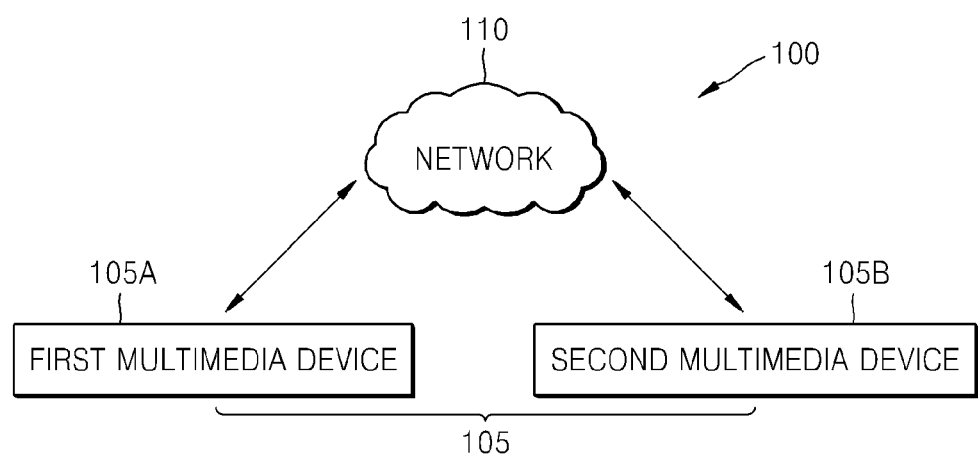
FIG. 1 schematically illustrates a system for sharing an output device between multimedia devices, according to an exemplary embodiment.

Reference will now be made in detail to the exemplary embodiments, examples of which are illustrated in the accompanying drawings. In this regard, the exemplary embodiments may have different forms and should not be construed as being limited to the descriptions set forth herein. Accordingly, the exemplary embodiments are merely described below, by referring to the figures, to explain aspects of the description. In the following description, well-known functions or constructions are not described in detail since they would obscure the invention with unnecessary detail, and like reference numerals in the drawings denote like or similar elements throughout the specification.

Throughout the specification, it will also be understood that when an element is referred to as being "connected to" or "coupled with" another element, it can be directly connected to or coupled with the other element. Or, the element can be electrically connected to or coupled with the other element by having an intervening element interposed there between. When a part "includes" or "comprises" an element, unless there is a particular description contrary thereto, the part can further include other elements, and does not exclude the other elements.

Expressions such as "at least one of," when preceding a list of elements, modify the entire list of elements and do not modify the individual elements of the list.

Throughout the specification, the fact that a first multimedia device approaches a second multimedia device indicates that the first multimedia device is positioned within a preset range of the second multimedia device. For example, the first multimedia device may be positioned within a short communication range of the second multimedia device but one or more exemplary embodiments of the present invention are not limited thereto.

The first multimedia device streaming data to the second multimedia device includes a case in which the first multimedia device provides the data to the second multimedia device in real-time, and then the data provided by the first multimedia device is output via an output device of the second multimedia device.

Hereinafter, exemplary embodiments will be described in detail with reference to the attached drawings.

FIG. 1 schematically illustrates a system 100 for sharing an output device between multimedia devices according to an exemplary embodiment. The system 100 may include multimedia devices 105 including a first multimedia device 105A and a second multimedia device 105B, and a network 110. The multimedia devices 105 are connected to each other via the network 110. Examples of the multimedia devices 105 may include, but are not limited to, a digital television (DTV), a mobile device, a laptop computer, a tablet device, a personal digital assistant (PDA), a smartphone and other portable devices. An example of the network 110 includes a local area network (LAN), a wide area network (WAN), a wireless network, or the like.

In exemplary embodiments, the multimedia devices 105 may be directly connected to each other by using wireless communication. The multimedia devices 105 may store various types of a plurality of pieces of multimedia data (hereinafter, 'the data'). An example of the data may include, but is not limited to, audio data and video data. In an exemplary embodiment, data of the first multimedia device 105A may be reproduced via an output device of the second multimedia device 105B. Also, data of the second multimedia device 105B may be reproduced via an output device of the first multimedia device 105A. The output device of the first multimedia device 105A may be an internal device included in the first multimedia device 105A or may be an external device connected to the first multimedia device 105A. The output device of the second multimedia device 105B may be an internal device included in the second multimedia device 105B or may be an external device connected to the second multimedia device 105B.

Figure 2:
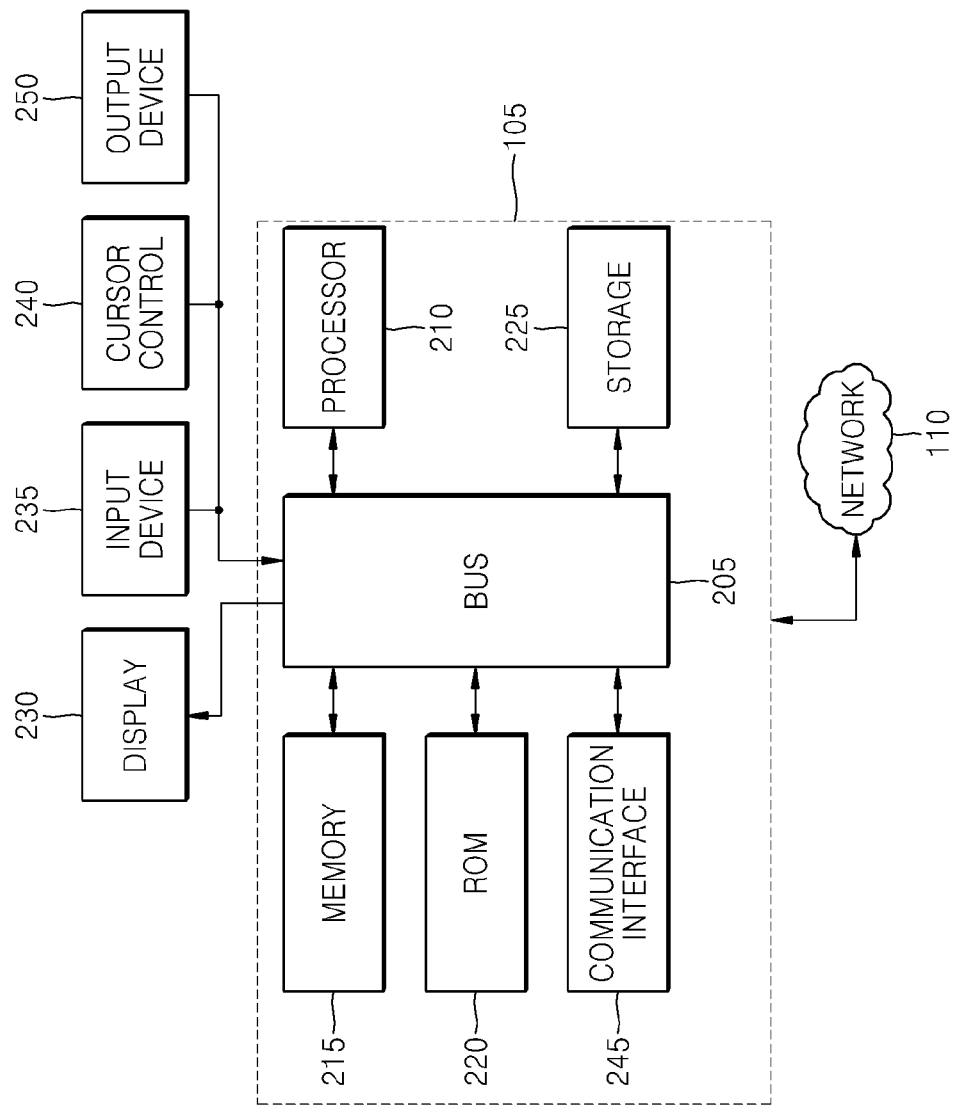
FIG. 2 is a block diagram of a multimedia device, according to an exemplary embodiment.

FIG. 2 is a block diagram of a multimedia device 105, according to an exemplary embodiment. The multimedia device 105 may include a bus 205, a processor 210, a memory 215, a read-only memory (ROM) 220, a storage 225, a display 230, an input device 235, a cursor control 240, a communication interface 245, and an output device 250.

The multimedia device 105A may include a bus 205 or other communication mechanism for communicating information. The processor 210 is connected to the bus 205 and processes the information. The memory 215 is connected to the bus 205 and is then executed by the processor 210, and may include at least one of a random access memory (RAM) and other dynamic storage devices. The memory 215 may be used to store a temporary variable or other intermediate information during execution of a command from the processor 210. The ROM 220 is connected to the bus 205 so as to store static information and a command with respect to the processor 210. The ROM 220 may include a static storage device. The storage 225, such as a magnetic disk or an optical disk, is provided for storing information and is coupled to the bus 205. An ultra-wideband wireless link that is optimally adapted to high-speed data transmission may be used to transmit information.

In order to display data, the multimedia device 105 may be connected to the display 230 such as a cathode ray tube (CRT) or a liquid crystal display (LCD) via the bus 205. In this case, the display 230 may function as the output device 250 of the multimedia device 105. The input device 235 including letters, numbers, and other keys may be connected to the bus 205 so as to deliver information and to select a command with respect to the processor 210. Other types of input devices may include, but is not limited to, a cursor control 240, such as a mouse and a trackball, for delivering direction information and a command to the processor 210 and controlling movement of a cursor on the display 230. In an exemplary embodiment, a touch screen may be used as the display 230 and the input device 235. The multimedia device 105 may further include a speaker or an audio output as the output device 250.

One or more exemplary embodiments are related to a use of the multimedia device 105 so as to embody a method described herein. In exemplary embodiments, the method is performed by the multimedia device 105 that includes the processor 210 to execute a control command included in the memory 215. The control command may be read by the memory 215 from the storage 225 that is a device-readable recording medium. By executing the control command included in the memory 215, the processor 210 may perform the processes described below.

In exemplary embodiments, the processor 210 may include one or more processors so as to perform one or more functions of the processor 210. Each of the processors is a hardware circuit that replaces or is combined with a software control command so as to perform a predetermined function.

Here, the term "device-readable recording medium" indicates a random recording medium that helps a device provide data to perform a predetermined function. In an exemplary embodiment using the multimedia device 105, the device-readable recording medium may be related to providing a control command for execution to the processor 210. The device-readable recording medium may be a volatile or non-volatile recording medium. The volatile recording medium may include a dynamic memory such as the memory 215. The non-volatile recording medium may include an optical or magnetic disk such as the storage 225. All of the aforementioned recording media have to be tangible so that a control command delivered via the recording media may be detected by a physical mechanism that reads the instructions into a machine. A general form of the device-readable recording medium may include a floppy disk, a flexible disk, a hard disk, a magnetic tape, another magnetic recording medium, a CD-ROM, optical media, a punched card, a punched tape, a physical recording medium having another punched pattern, a RAM, a PROM, an EPROM, a FLASH-EPROM, a random memory chip and a cartridge.

In another exemplary embodiment, the device-readable recording medium may be a transmission medium that includes a wire including the bus 205, a coaxial cable, a copper wire, and an optical fiber. The transmission medium may be in the form of acoustic or light waves, such as those generated during radio-wave and infra-red data communications. An example of the device-readable recording medium may include, but is not limited to, a transmission wave or a random recording medium that is readable to the multimedia device 105. The control command may be initially executed on a magnetic disk of a remote computer. The remote computer may load the control command to its dynamic memory and may send the control command via a telephone line by using a modem. The modem with respect to the multimedia device 105 may receive data via the telephone line or may use an infrared transmitter so as to convert the data into an infrared signal. An infrared detector may receive the data in the form of the infrared signal, and an appropriate circuit (not shown) may dispose the data on the bus 205. The bus 205 may deliver the data to the memory 215 and then the processor 210 may retrieve the control command from the memory 215 and may execute the control command. The control command received by the memory 215 may be selectively stored in the storage 225 after or before the control command is executed by the processor 210. All of the aforementioned recording media have to be tangible so that the control command delivered via the recording media may be detected by the device-readable physical mechanism.

The multimedia device 105 includes the communication interface 245 connected to the bus 205. The communication interface 245 provides bi-directional data communication between the first multimedia device 105A and the second multimedia device 105B, via the network 110. In an exemplary embodiment, the communication interface 245 may be an integrated services digital network (ISDN) card or a modem to provide a data communication connection in correspondence to each type of telephone line. In another exemplary embodiment, the communication interface 245 may be a LAN card to provide a data communication connection to a compatible LAN. In the exemplary embodiments, the communication interface 245 may transmit and receive an electric signal, an electromagnetic signal or an optical signal which delivers a digital data stream indicating various types of information.

The processor 210 in the multimedia device 105 may operate to transmit a low power signal. In an exemplary embodiment, the low power signal may be transmitted by using a wireless device embedded in the multimedia device 105, instead of using the processor 210. For example, Bluetooth is either integrated into the processor 210 or is a separate wireless device connected to the processor 210 and embedded in the multimedia device 105. With respect to detection by the second multimedia device 105B, the processor 210 may output notice information via the output device of the first multimedia device 105A. Also, the processor 210 may display a list of the second multimedia devices 105B on a display of the first multimedia device 105A, so that a user may select at least one second multimedia device 105B to share an output device with the first multimedia device 105A and may select the output device to output data. The processor 210 may transmit the data to the output device of the selected second multimedia device 105B.

Although FIG. 2 illustrates an exemplary embodiment in which the display 230, the input device 235, the cursor control 240, and the output device 250 are separate external devices that are connected to the multimedia device 105, one or more exemplary embodiments are not limited thereto. That is, at least one of the display 230, the input device 235, the cursor control 240, and the output device 250 may be included in the multimedia device 105.

Figure 3:
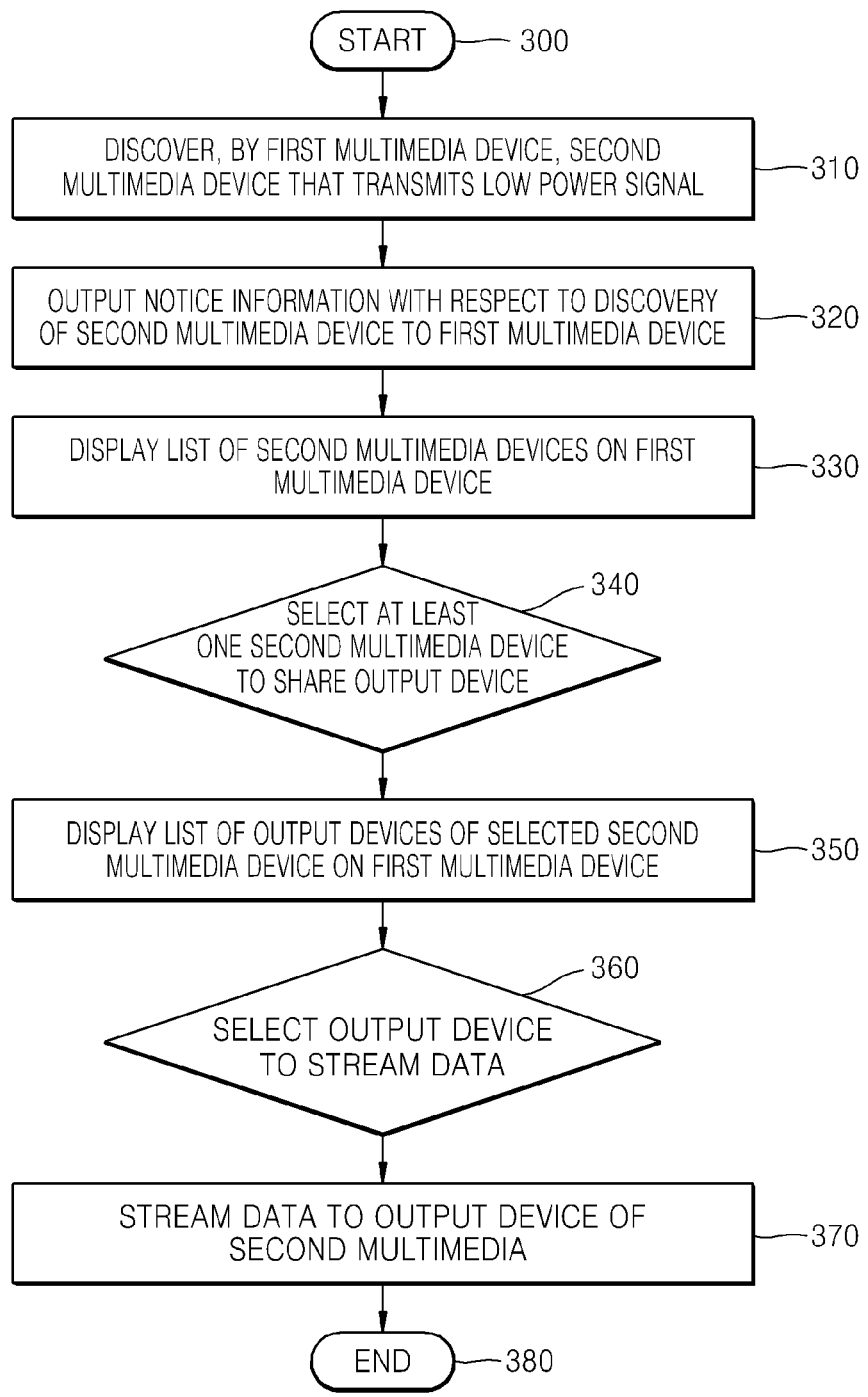
FIG. 3 is a flowchart of a method of sharing an output device between multimedia devices, according to an exemplary embodiment.

FIG. 3 is a flowchart of a method of sharing an output device between multimedia devices, according to an exemplary embodiment.

In operation 310, the first multimedia device 105A automatically discovers the second multimedia device 105B that transmits a low power signal. The low power signal may be transmitted from a multimedia device 105 so as to be discovered by another multimedia device 105. Also, the low power signal may be transmitted via a wireless communication network. An example of wireless communication may include, but is not limited to, near field communication (NFC) and Bluetooth® communication. The first multimedia device 105A may transmit the low power signal and then may be discovered by the second multimedia device 105B. In an exemplary embodiment, the low power signal may be periodically transmitted at a preset interval. When the second multimedia device 105B that transmits the low power signal is positioned within a preset range, and then the first multimedia device 105A detects the low power signal, the first multimedia device 105A may automatically discover the second multimedia device 105B without a separate user input. The low power signal has a low bandwidth optimally adapted to handshaking and is for exchanging a small volume of data between the multimedia devices 105. The handshaking indicates a process in which the multimedia devices 105 mutually exchange information related to data exchange capability and information related to a line state so as to determine a speed of a data exchange. The data exchange may include a key exchange so as to maintain a bit transmission speed and a link.

In operation 320, since the second multimedia device 105B is discovered, the first multimedia device 105A outputs notice information on the display 230 of the first multimedia device 105A. In an exemplary embodiment, the first multimedia device 105A may display a notice icon so as to inform a user that the first multimedia device 105A and the second multimedia device 105B are within a predetermined range, wherein the second multimedia device 105B has a function of sharing an output device such as an audio device or a display device. In another exemplary embodiment, the first multimedia device 105A may provide an option for enabling cancellation of an output of the notice information.

In operation 330, the first multimedia device 105A displays a list of the discovered second multimedia devices 105B on the display 230 of the first multimedia device 105A. In an exemplary embodiment, when the notice icon is tapped, the list of the discovered second multimedia devices 105B may be displayed.

In operation 340, the first multimedia device 105A may select at least one second multimedia device 105B to share an output device with the first multimedia device 105A, based on a user input with respect to the list of the discovered second multimedia devices 105B.

In operation 350, the first multimedia device 105A displays a list of output devices of the selected second multimedia device 105B on the display 230 of the first multimedia device 105A. In an exemplary embodiment, when the selected second multimedia device 105B is an audio player, an output device of the selected second multimedia device 105B may be a speaker. In another exemplary embodiment, when the selected second multimedia device 105B is a TV, an output device of the selected second multimedia device 105B may be a screen and a speaker. In another exemplary embodiment, when a plurality of the second multimedia devices 105B are selected, a list of output devices of each of the second multimedia devices 105B may be displayed on the first multimedia device 105A.

In operation 360, the first multimedia device 105A may select an output device to output data, based on the user input. An output device of the first multimedia device 105A or an output device of the second multimedia device 105B may be selected as a device to output the data of the first multimedia device 105A. The first multimedia device 105A may display an option for matching the output device of the second multimedia device 105B with the data, on the display 230 of the first multimedia device 105A. In an exemplary embodiment, audio data may be selected to be output via an audio device of the second multimedia device 105B, and video data may be selected to be reproduced via the output device of the first multimedia device 105A. In another exemplary embodiment, the audio data may be selected to be output via a speaker of the second multimedia device 105B, and the video data may be selected to be output via a screen of the second multimedia device 105B. In another exemplary embodiment, the video data and the audio data may be selected to be output via the second multimedia devices 105B.

In operation 370, the first multimedia device 105A transmits the data to the output device of the second multimedia device 105B, based on the user input. In an exemplary embodiment, the first multimedia device 105A may request that the second multimedia device 105B provide an approval with respect to transmission of the data. The second multimedia device 105B may approve or reject the request. The first multimedia device 105A may be notified regarding the approval or the rejection in response to the request. Prior to the transmission of the data, at least one parameter is determined in order to establish a link between the first multimedia device 105A and the second multimedia device 105B, based on an attribute of the selected output device. The parameter may include, but is not limited to, video and audio bit transmission rates, a data file format, and a codec. In an exemplary embodiment, the parameter may be automatically determined with respect to a data exchange between the first multimedia device 105A and the second multimedia device 105B. The transmission of the data may be performed by using a digital signal or an analog signal. In an exemplary embodiment, the audio data may be transmitted by using frequency modulation, and the video data may be transmitted by using radio frequency transmission. The data may be transmitted by using a high speed wireless technology of short range with high throughput and less error checking in order to maximize speed of connection. The short range high-speed wireless technology may be optimized for the transmission of the data including the audio data and the video data. At a preset point of time or at an end of the transmission, the link between the first multimedia device 105A and the second multimedia device 105B may be disconnected.

Figure 4:
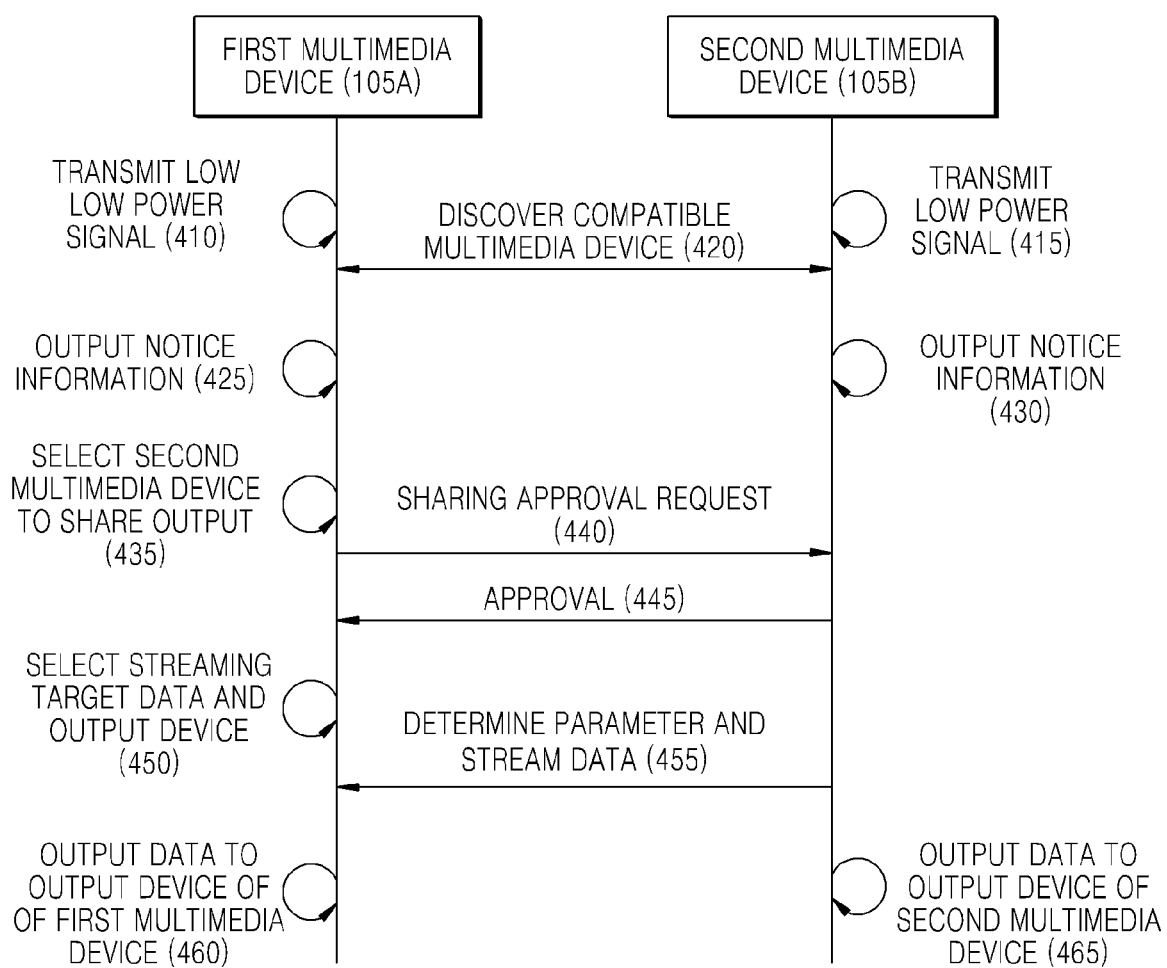
FIG. 4 is a flowchart of a method of sharing an output device between multimedia devices, according to another exemplary embodiment.

FIG. 4 is a flowchart of a method of sharing an output device between multimedia devices, according to another exemplary embodiment.

In operation 410, each of the first multimedia device 105A and the second multimedia device 105B transmits a low power signal. The low power signal may be transmitted from a multimedia device 105 so as to be discovered by another multimedia device 105. Also, the low power signal may be transmitted via a wireless communication network. An example of wireless communication may include, but is not limited to, NFC and Bluetooth® communication. The low power signal has a low bandwidth which is optimally adapted to handshaking and is for an exchange of a small volume of data between the multimedia devices 105. In an exemplary embodiment, the low power signal may be periodically transmitted by a preset interval.

In operation 415, the first multimedia device 105A and the second multimedia device 105B may discover each other. When the second multimedia device 105B that transmits the low power signal is positioned within a preset range, the first multimedia device 105A may automatically discover the second multimedia device 105B without a separate user input. When the first multimedia device 105A that transmits the low power signal is positioned within a preset range, the second multimedia device 105B may automatically discover the first multimedia device 105A.

Figure 5:
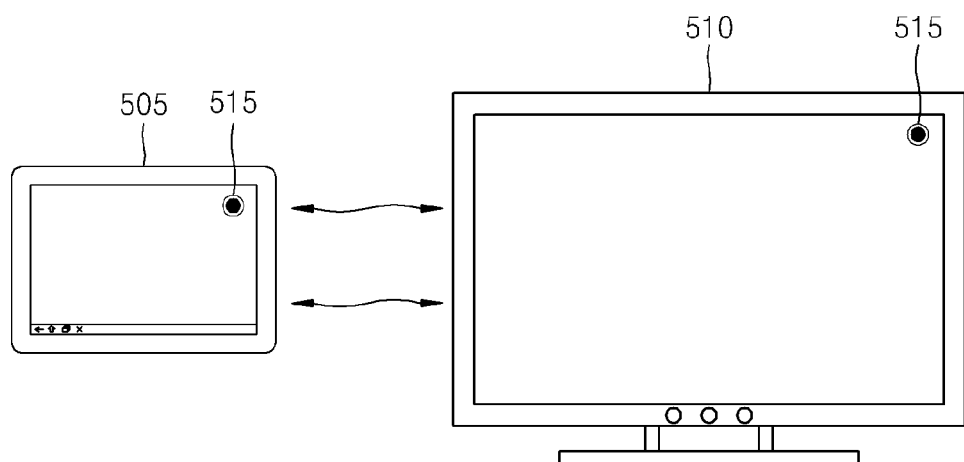
FIG. 5 illustrates an example in which a multimedia device is discovered and notice information is output.

In operation 420, each of the first multimedia device 105A and the second multimedia device 105B outputs notice information with respect to the discovery of the multimedia device 105. In an exemplary embodiment, the first multimedia device 105A may display a notice icon on a display of the first multimedia device 105A so as to inform the user that the first multimedia device 105A and the second multimedia device 105B are within a predetermined range, wherein the second multimedia device 105B has a function of sharing an output device such as an audio device or a display device. In another exemplary embodiment, when the first multimedia device 105A does not desire sharing of the output device, the first multimedia device 105A may provide an option for enabling cancellation of an output of the notice information. Similarly, when the second multimedia device 105B discovers the first multimedia device 105A, the second multimedia device 105B may display notice information on a display of the second multimedia device 105B or may display an option to cancel an output of the notice information on the display of the second multimedia device 105B. FIG. 5 illustrates an example in which a multimedia device is discovered and notice information is output.

Referring back to FIG. 4, in operation 430, the first multimedia device 105A may select the second multimedia device 105B to share an output device with the first multimedia device 105A. In an exemplary embodiment, in response to a plurality of the second multimedia devices 105B existing, a list of the second multimedia devices 105B may be displayed on the display of the first multimedia device 105A. The first multimedia device 105A may select at least one second multimedia device 105B to share an output device with the first multimedia device 105A from the list of the second multimedia devices 105B, based on a user input. In an exemplary embodiment, the second multimedia devices 105B may be selected. In another exemplary embodiment, the second multimedia device 105B may be selected by a plurality of the first multimedia devices 105A.

In operation 435, the first multimedia device 105A transmits a sharing approval request to the selected second multimedia device 105B. The selected second multimedia device 105B may receive a notice message with respect to the sharing approval request and may display an option for approving or rejecting sharing of the output device.

In operation 440, the second multimedia device 105B may approve or reject the sharing approval request, based on a user input. A result of approving or rejecting the sharing approval request may be displayed on the display of the first multimedia device 105A.

When the sharing approval request is approved in operation 450, the first multimedia device 105A selects data to be transmitted and selects an output device to output the data, based on a user input. In an exemplary embodiment, the first multimedia device 105A may select an audio device of the second multimedia device 105B to output audio data, and may select the output device of the first multimedia device 105A to reproduce video data, based on a user input. In another exemplary embodiment, the first multimedia device 105A may select a speaker of the second multimedia device 105B to output the audio data, and may select a screen of the second multimedia device 105B to output the video data, based on a user input. In another exemplary embodiment, the first multimedia device 105A may select a plurality of the second multimedia devices 105B in order to output the video data and the audio data, based on a user input.

In operation 455, for transmission of the data, a parameter is determined to establish a link between the first multimedia device 105A and the second multimedia device 105B. The parameter is determined based on an attribute of the selected output device. The parameter may include, but is not limited to, video and audio bit transmission rates, a data file format, and a codec. In an exemplary embodiment, the parameter may be automatically determined with respect to a data exchange between the first multimedia device 105A and the second multimedia device 105B. When the parameter is determined, the data is transmitted.

In an exemplary embodiment, the transmission of the data may be executed without a separate control command. An environment setting, including preferences, may be stored in a setting section of the multimedia device 105, and at least one default operation may be previously set. In an example of the default operation, an environment setting sheet of the first multimedia device 105A may be set in such a manner that the first multimedia device 105A may receive video data from the second multimedia device 105B within a preset range. In this case, as soon as the second multimedia device 105B enters the preset range, the first multimedia device 105A may start reproducing the video data of the second multimedia device 105B via a screen of the first multimedia device 105A.

FIG. 5 illustrates an example in which a multimedia device is discovered and notice information is output. When a tablet device 505 is positioned in a room where a TV 510 exists, notice information 515 is output to an upper right corner portion of each of the tablet device 505 and the TV 510 so as to inform that the tablet device 505 is within a fixed range of the TV 510 enabled to share an output device. The notice information 515 may be visual information such as a notice icon or audio information, such as a signal sound.

Figure 6:
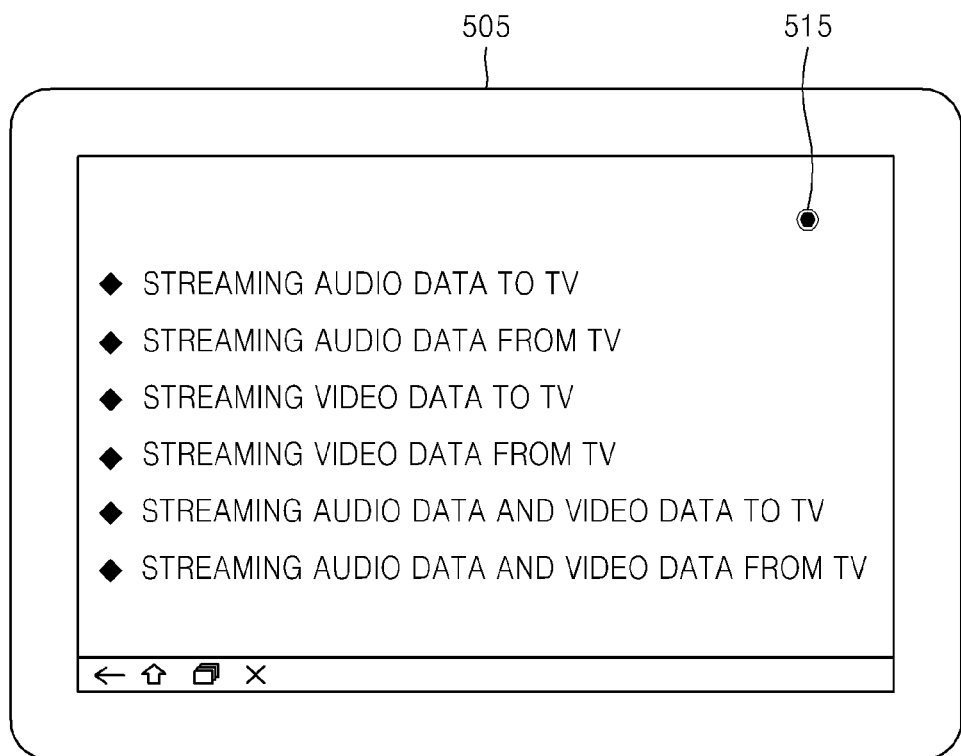
FIG. 6 illustrates an example in which options for selecting data streaming are displayed, according to an exemplary embodiment.

FIG. 6 illustrates an example in which options for selecting data streaming are displayed, according to an exemplary embodiment. When the notice icon 515 of the first multimedia device 105A is tapped, a list of options for selecting streaming of data such as audio data, video data, or audio and video data to the TV 510 or from the TV 510, may be displayed. The streaming may be bi-directionally performed. That is, the tablet device 505 may transmit and receive data. As illustrated in FIG. 6, the list may include, but is not limited to, the options of 'streaming audio data to TV,' 'streaming audio data from TV,' 'streaming video data to TV,' 'streaming video data from TV,' 'streaming audio data and video data to TV,' and 'streaming audio data and video data from TV.' In another exemplary embodiment, when a default operation with respect to the data streaming is set, the first multimedia device 105A may automatically start transmitting or receiving at least one of audio data and video data without a separate user input, based on the output device of the second multimedia device 105B, without any related setting.

Figure 7:
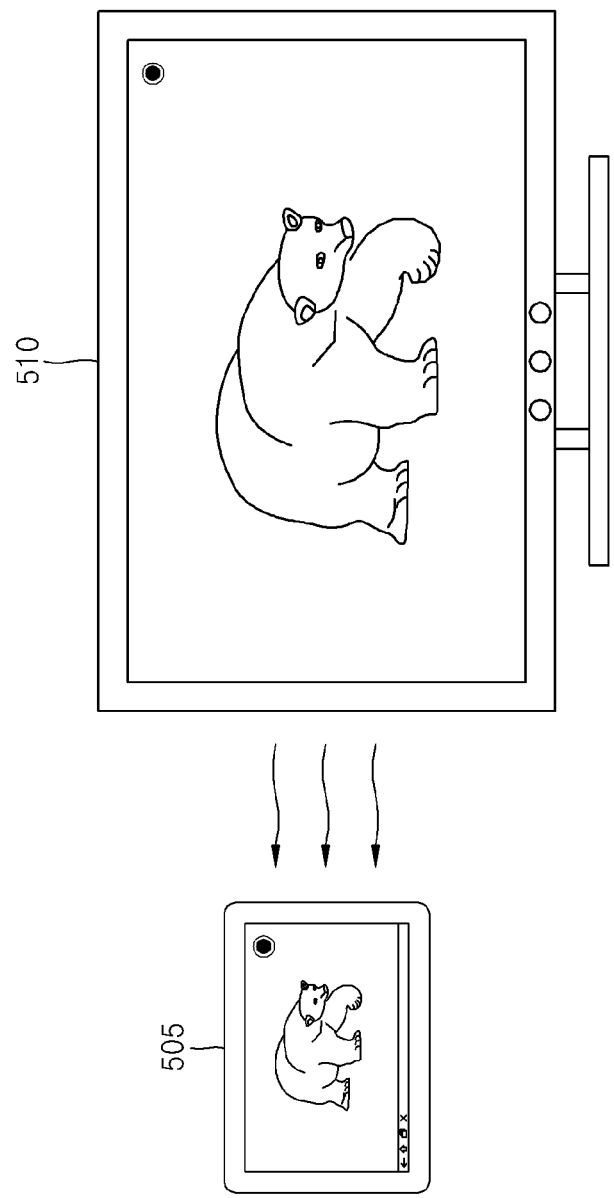
FIG. 7 illustrates a data exchange between multimedia devices, according to an exemplary embodiment.

FIG. 7 illustrates a data exchange between multimedia devices, according to an exemplary embodiment. When the tablet device 505 receives an input of selection for an option with respect to transmitting audio data and video data from the TV 510 to the tablet device 505, the audio data and video data are transmitted from the TV 510 to the tablet device 505.

Figure 8:
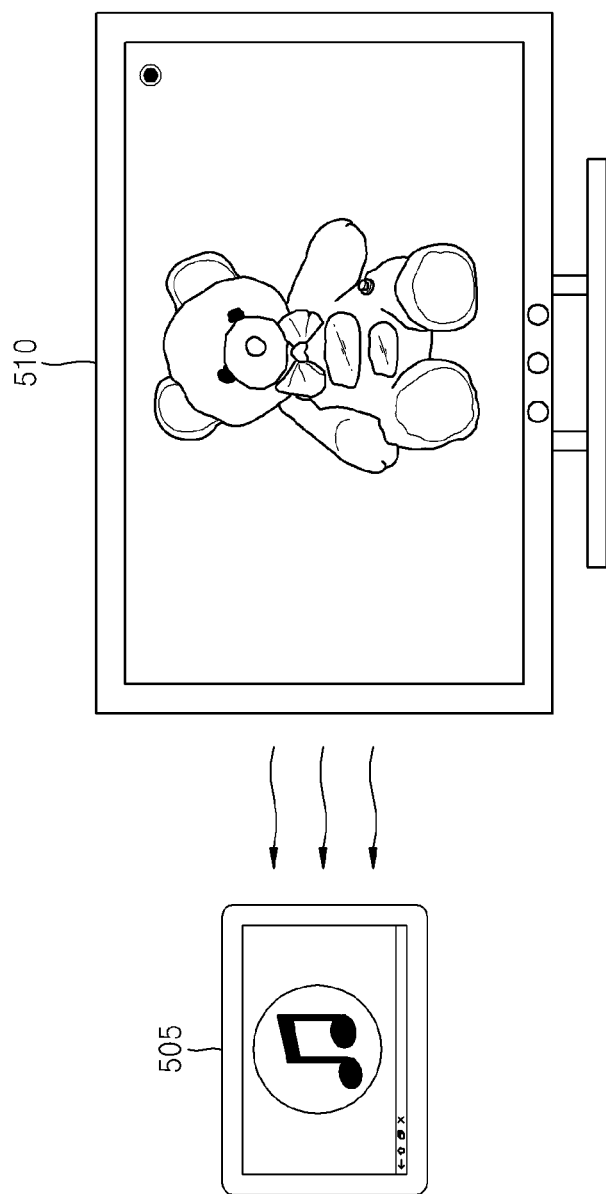
FIG. 8 illustrates a data exchange between multimedia devices, according to another exemplary embodiment.

FIG. 8 illustrates a data exchange between multimedia devices, according to another exemplary embodiment. In an exemplary embodiment, audio data of the TV 510 may be reproduced via a speaker of the tablet device 505, and each of the TV 510 and the tablet device 505 may output its own video data to its own screen. Conversely, in another exemplary embodiment, audio data of the tablet device 505 may be reproduced via a speaker of the TV 510, and each of the TV 510 and the tablet device 505 may output its own video data to its own screen.

Figure 9:
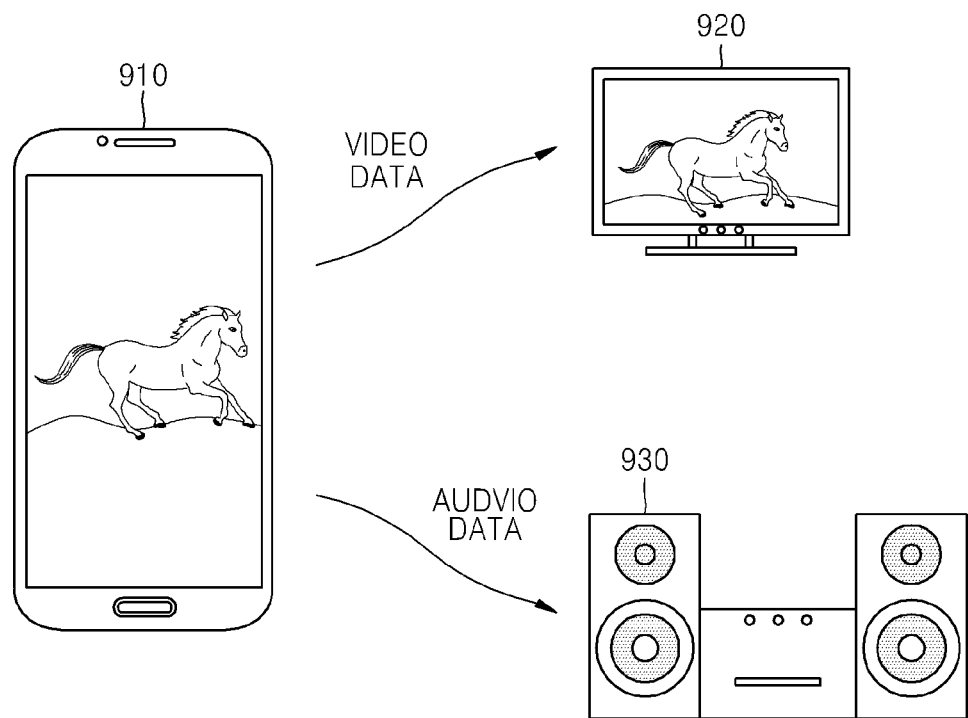
FIG. 9 illustrates a data exchange between multimedia devices, when a plurality of second multimedia devices exist, according to an exemplary embodiment.

FIG. 9 illustrates a data exchange between multimedia devices, in response to a plurality of the second multimedia devices 105B existing, according to an exemplary embodiment. A portable terminal 910 that is the first multimedia device 105A automatically discovers the second multimedia devices 105B that transmits a low power signal. The portable terminal 910 may select a TV 920 and an audio player 930 from among the discovered second multimedia devices 105B so as to share an output device, based on a user input via the portable terminal 910. The portable terminal 910 may select a screen of the TV 920 as an output device to receive video data and may select a speaker of the audio player 930 as an output device to receive audio data, based on a user input. Then, the video data of the portable terminal 910 is output via the screen of the TV 920, and the audio data of the portable terminal 910 is output via the speaker of the audio player 930.

Figure 10:
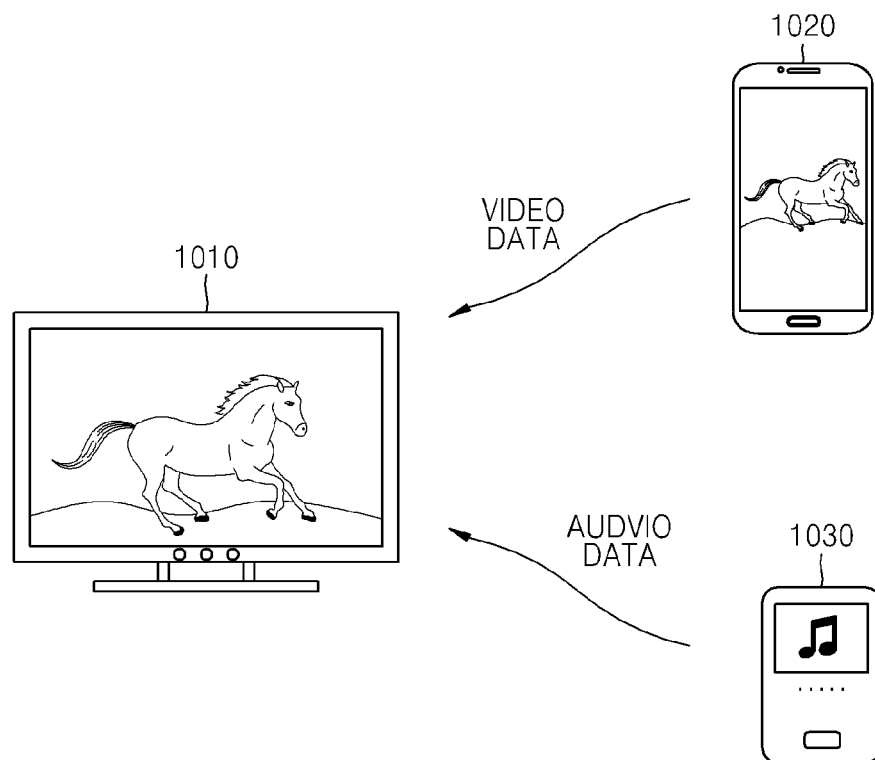
FIG. 10 illustrates a data exchange between multimedia devices, in response to a plurality of second multimedia devices existing, according to another exemplary embodiment.

FIG. 10 illustrates a data exchange between multimedia devices, in response to a plurality of the second multimedia devices 105B existing, according to another exemplary embodiment. A TV 1010 that is the first multimedia device 105A automatically discovers the second multimedia devices 105B that transmit a low power signal. A user of the TV 1010 may select a portable terminal 1020 and an MP3 player 1030 from among the discovered second multimedia devices 105B so as to share an output device. Also, the user of the TV 1010 may select a screen of the TV 1010 as an output device to reproduce video data of the portable terminal 1020, and may select a speaker of the TV 1010 as an output device to reproduce audio data of the MP3 player 1030. Then, the video data of the portable terminal 1020 is output via the screen of the TV 1010, and the audio data of the MP3 player 1030 is output via the speaker of the TV 1010.

As described above, according to the one or more of the above embodiments, by efficiently sharing an output device, audio and video functions of a multimedia device may expand beyond integrated hardware. Also, according to one or more of the above exemplary embodiments, data may be smoothly exchanged by using an existing technology, without a complicated setting operation.

The one or more exemplary embodiments may be embodied as a non-transitory computer-readable recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile medium, and detachable and non-detachable medium which are designed to store information including computer readable commands, data structures, program modules or other data. The communication medium includes computer-readable commands, a data structure, a program module, and other transmission mechanism, and includes other information transmission mediums.

The present invention may, however, be embodied in many different forms and should not be construed as being limited to the exemplary embodiments set forth herein. Rather, these exemplary embodiments are provided so that this disclosure will be thorough and complete, and will fully convey the invention to those of ordinary skill in the art. For example, configuring elements that are singular forms may be executed in a distributed fashion, and also, configuring elements that are distributed may be combined and then executed.

It should be understood that the exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of bi-directional sharing of video data and audio data between a first multimedia device with a plurality of second multimedia devices, the method comprising:
    discovering the plurality of second multimedia devices by detecting a low power signal transmitted by the plurality of second multimedia devices when the first multimedia device is positioned within a communication range of the plurality of second multimedia devices;
    displaying, in response to the discovering, on a display of the first multimedia device, a list of the discovered second multimedia devices;
    selecting second multimedia devices from the list of the discovered second multimedia devices, based on a first user input;
    transmitting, to the selected second multimedia devices, an audio-video sharing request to request audio-video sharing approval from the selected second multimedia devices to share the video data and the audio data between the first multimedia device and the plurality of second multimedia devices;
    receiving a response of audio-video sharing approval or audio-video sharing rejection from each of the selected second multimedia devices;
    displaying, in response to the audio-video sharing approval or audio-video sharing rejection from the selected second multimedia devices, on the display of the first multimedia device, a list of the second multimedia devices from which an audio-video sharing approval was received;
    selecting second multimedia devices for sharing the video data and the audio data between the first multimedia device and the second multimedia devices from which an audio-video sharing approval was received, based on a second user input; and
    for each of the selected second multimedia devices, displaying options for bi-directional sharing of the video data and the audio data;
    wherein the displayed options comprise: transmitting video data to the second multimedia device, transmitting audio data to the second multimedia device, transmitting video and audio data to the second multimedia device, receiving video data from the second multimedia device, receiving audio data from the second multimedia device, and receiving video and audio data from the second multimedia device;

selecting at least one of the displayed options;

transmitting and receiving the video data and the audio data in accordance with the selected at least one option, wherein, the video data is reproducible by one of the selected second multimedia devices and the audio data is reproducible by another one of the selected second multimedia devices.

2. The method of claim 1, wherein the low power signal is periodically transmitted from the plurality of second multimedia devices.

3. The method of claim 1, further comprising determining a parameter that is used to establish a link between the first multimedia device and the second multimedia device prior to the transmitting and receiving the video data and the audio data, wherein the video data and the audio data is transmitted from the first multimedia device to the separate selected second multimedia devices via the link established based on the determined parameter.

4. The method of claim 1, further comprising determining a parameter that is used to establish a link between the first multimedia device and the second multimedia devices, according to an attribute of the separate selected second multimedia devices, the parameter comprising at least one among a transmission rate of the video data and the audio data, a file format of the video data and the audio data and a codec, wherein the video data and the audio data is transmitted from the first multimedia device to the separate selected second multimedia devices via the link established based on the determined parameter.

5. The method of claim 1, further comprising displaying, on the display of the first multimedia device, an option to match the separate selected second multimedia devices with the video data and the audio data.

6. The method of claim 1, wherein the transmitting of the video data and the audio data comprises streaming the video data and the audio data of the first multimedia device from the first multimedia device to the separate selected second multimedia devices.

7. The method of claim 1, wherein a default operation is previously set in the first multimedia device to allow the first multimedia device to automatically transmit the video data and the audio data to the discovered second multimedia devices when the plurality of second multimedia devices are discovered.

8. The method of claim 1, further comprising displaying, on the display of the multimedia device, a list of options, each of the options indicating a data type to be transmitted from among the audio data, the video data and both the audio and the video data, and a direction of transmission.

9. A non-transitory computer-readable recording medium having recorded thereon a program, wherein the program, when executed by a processor of a computer, causes the computer to execute the method of claim 1.

10. A method of bi-directional sharing, by a first multimedia device, video data and audio data, with a plurality of second multimedia devices, the method comprising:

transmitting, by the first multimedia device, a low power signal;

receiving an audio-video sharing request to request sharing approval to share the video data and the audio data from each of the plurality of second multimedia devices in response to the first multimedia device being, discovered by the plurality of second multimedia devices, based on the transmitted low power signal;

displaying, in response to the audio-video sharing requests that are received, on a display of the first multimedia device, the list of the plurality of second multimedia, devices from which the audio-video sharing requests have been received;

selecting second multimedia devices from the list of the plurality of second multimedia devices, based on a first user input;

for each of the selected second multimedia devices, displaying options for bi-directional sharing of the video data and the audio data;

wherein the displayed options comprise: transmitting video data to the second multimedia device, transmitting audio data to the second multimedia device, transmitting video and audio data to the second multimedia device, receiving video data from the second multimedia device, receiving audio data from the second multimedia device, and receiving video and audio data from the second multimedia device:

selecting at least one of the displayed options;

transmitting an audio-video sharing approval or an audio-video sharing rejection of the received audio-video sharing requests to each of the selected second multimedia devices;

receiving and transmitting the video data and the audio data in accordance with the selected at least one option, in response to transmitting the audio-video sharing approval; and outputting the video data and audio data, wherein the first multimedia device is discovered when the first multimedia device is positioned within a communication range of the second multimedia devices, wherein, the video data is reproducible by one of the selected second multimedia devices and the audio data is reproducible by another one of the selected second multimedia devices.

11. The method of claim 10, further comprising:

displaying, on the display of the first multimedia device, an option for selecting approval or rejection of the received audio-video sharing request to the plurality of second multimedia devices; and selecting the audio-video sharing approval or the audio-video sharing, rejection from the displayed option, based on a second user input for selecting the option for the audio-video sharing approval or the audio-video sharing rejection from the displayed option.

12. The method of claim 11, further comprising:

displaying, on the display of the first multimedia device, an option to match the received video data and the audio data from the audio-video sharing approved second multimedia devices with the display and a speaker of the first multimedia device.

13. The method of claim 10, further comprising determining a parameter that is used to establish a link between the first multimedia device and the approved second multimedia devices, according to an attribute of the display and a speaker of the first multimedia device, the parameter comprising at least one among a transmission rate of the video data and the audio data, a file format of the video data and the audio data and a codec, wherein the video data and the audio data is received and transmitted between the audio-video sharing approved second multimedia devices and the first multimedia device via the link established based on the determined parameter.

14. A first multimedia device bi-directionally sharing video data and audio data with a plurality of second multimedia devices, the first multimedia device comprising:
at least one memory; and
a processor configured to execute at least one computer program stored in the at least one memory, wherein the at least one computer program comprises commands for performing a process comprising:
discovering the plurality of second multimedia devices by detecting a low power signal transmitted by the plurality of second multimedia devices when the first multimedia device is positioned within a communication range of the plurality of second multimedia devices;
displaying, in response to the discovering, on a display of the first multimedia device, a list of the discovered second multimedia devices selecting second multimedia devices from the list of the discovered second multimedia devices, based on a first user input;
transmitting to the selected second multimedia devices, an audio-video sharing request to request audio-video sharing approval from the selected second multimedia devices to share the video data and the audio data between the first multimedia device and the plurality of second multimedia devices;
receiving a response of audio-video sharing approval or audio-video sharing rejection from each of the selected second multimedia devices;
displaying, in response to the audio-video sharing approval or audio-video sharing rejection of the selected second multimedia devices, on the display of the first multimedia device, a list of the second multimedia devices from which an audio-video sharing approval has been received;
selecting second multimedia devices for sharing the video data and the audio data between the first multimedia device and the second multimedia devices from which an audio-video sharing approval was received, based on a second user input; and
for each of the selected second multimedia devices, displaying options for bi-directional sharing of the video data and the audio data;
wherein the displayed options comprise: transmitting video data to the second multimedia device, transmitting audio data to the second multimedia device, transmitting video and audio data to the second multimedia device, receiving video data from the second multimedia device, receiving audio data from the second multimedia device, and receiving video and audio data from the second multimedia device;
selecting at least one of the displayed options;
transmitting and receiving the video data and the audio data of the first multimedia device in accordance with the selected at least one option, wherein, the video data is reproducible by one of the selected second multimedia devices and the audio data is reproducible by another one of the selected second multimedia devices.

15. The first multimedia device of claim 14, wherein the low power signal is periodically transmitted from the plurality of second multimedia devices.

16. The first multimedia device of claim 14, wherein the at least one computer program comprises the commands for performing the process further comprising,
prior to the transmitting and receiving the video data and the audio data, determining a parameter that is used to establish a link between the first multimedia device and the second multimedia devices, and
the video data and the audio data is transmitted from the first multimedia device to the separate selected second multimedia devices via the link established based on the determined parameter.

17. The first multimedia device of claim 14, wherein the at least one computer program comprises the commands for performing the process further comprising
determining a parameter that is used to establish a link between the first multimedia device and the second multimedia devices, according to an attribute of the separate selected second multimedia devices, the parameter comprising at least one among a transmission rate of the video data and audio data, a file format of the video data and the audio data, and a codec, and
the video data and the audio data is transmitted from the first multimedia device to the separate selected second multimedia devices via the link established based on the determined parameter.

18. The first multimedia device of claim 14, wherein the at least one computer program comprises the commands for performing the process further comprising:
displaying, on the first display of the first multimedia device, an option to match the separate selected second multimedia devices with the video data and the audio data.

19. A non-transitory computer-readable recording medium having recorded thereon a program, wherein the program, when executed by a processor of a computer, causes the computer to execute the method of claim 10.

20. A first multimedia device bi-directionally sharing video data and audio data with a plurality of second multimedia devices, the first multimedia device comprising:
at least one memory; and
a processor configured to execute at least one computer program stored in the at least one memory,
wherein the at least one computer program comprises commands for performing a process comprising:
transmitting, by the first multimedia device, a low power signal;
receiving an audio-video sharing request to request sharing approval to share video data and audio data from each of the plurality of second multimedia devices in response to the first multimedia device being discovered by the plurality of second multimedia devices, based on the transmitted low power signal;
displaying, in response to the audio-video sharing requests that are received, on a display of the first multimedia device, the list of the plurality of second multimedia devices from which the audio-video sharing requests have been received;
selecting second multimedia devices from the list of the plurality of second multimedia devices, based on a first user input;
for each of the selected second multimedia devices, displaying options for bi-directional sharing of the video data and the audio data;
wherein the displayed options comprise; transmitting video data to the second multimedia device, transmitting audio data to the second multimedia device, transmitting video and audio data to the second multimedia device, receiving video data from the second multimedia device, receiving audio data from the second multimedia device, and receiving video and audio data from the second multimedia device;

selecting at least one of the displayed options;

transmitting an audio-video sharing approval or an audio-video sharing rejection of the received audio-video sharing requests to each of the selected second multimedia devices;

receiving and transmitting the video data and the audio data in accordance with the selected at least one option, in response to transmitting the audio-video sharing approval; and outputting the video data and the audio data, wherein the first multimedia device is discovered when the first multimedia device is positioned within a communication ranges of the second multimedia devices, wherein, the video data is reproducible by one of the selected second multimedia devices and the audio data is reproducible by another one of the selected second multimedia devices.

21. The first multimedia device of claim 20, wherein the at least one computer program comprises the commands for performing the process further comprising:

displaying, on the display of the first multimedia device, an option for selecting audio-video sharing approval or audio-video sharing rejection of the received audio-video sharing request to the plurality of second multimedia devices; and selecting the audio-video sharing approval or the audio-video sharing rejection from the displayed option, based on a second user input for selecting the option for the audio-video sharing approval or the audio-video sharing rejection from the displayed option.

22. The first multimedia device of claim 20, wherein the at least one computer program comprises the commands for performing the process further comprising:

displaying, on the display of the first multimedia device, an option for matching the received video data and audio data from the audio-video sharing approved second multimedia devices with the display and a speaker of the first multimedia device.

23. The first multimedia device of claim 20, wherein the at least one computer program comprises the commands for performing the process further comprising:

determining a parameter that is used to establish a link between the first multimedia device and the audio-video sharing approved second multimedia devices, according to an attribute of the display and a speaker of the first multimedia device, the parameter comprising at least one among a transmission rate of the video data and the audio data, a file format of the video data and the audio data and a codec, wherein the video data and the audio data is received and transmitted between the audio-video sharing approved second multimedia devices and the first multimedia device via the link established based on the determined parameter.

* * * * *